United States Patent
Benyassine et al.

(10) Patent No.: US 6,721,712 B1
(45) Date of Patent: Apr. 13, 2004

(54) CONVERSION SCHEME FOR USE BETWEEN DTX AND NON-DTX SPEECH CODING SYSTEMS

(75) Inventors: Adil Benyassine, Irvine, CA (US); Eyal Shlomot, Irvine, CA (US); Huan-Yu Su, San Clemente, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 97 days.

(21) Appl. No.: 10/057,250

(22) Filed: Jan. 24, 2002

(51) Int. Cl.[7] .............................. G10L 19/00
(52) U.S. Cl. .................... 704/503; 455/522; 455/416; 704/501
(58) Field of Search ................. 704/211, 228, 704/501, 503; 455/522, 416; 370/545; 375/346

(56) References Cited

U.S. PATENT DOCUMENTS

| | | | |
|---|---|---|---|
| 5,689,511 A | * 11/1997 | Shimazaki et al. | 370/545 |
| 6,055,497 A | * 4/2000 | Hallkvist et al. | 704/228 |
| 6,078,809 A | * 6/2000 | Proctor | 455/416 |
| 6,097,772 A | * 8/2000 | Johnson et al. | 375/346 |
| 6,308,081 B1 | * 10/2001 | Kolmonen | 455/522 |

OTHER PUBLICATIONS

Serizawa, Ito and Nomura, "A Silence Compression Algorithm for Multi–Rate/Dual–Bandwidth MPEG–4 CELP Standard", ICASSP, vol. 2, 2000, pp. 1173–1176.*

Das and Gersho, "A Variable–Rate Natural–Quality Parametric Speech Coder", Int'l Conference on Communications, May 1–5, 1994, pp. 216–220.*

* cited by examiner

*Primary Examiner*—David D. Knepper
(74) *Attorney, Agent, or Firm*—Farjami & Farjami LLP (57) ABSTRACT

In an exemplary conversion scheme, a frame of a first speech signal comprising a plurality of frames encoded at a plurality of first rates, including a first non-speech rate, is received. The rate of the received frame is determined, and if the received frame is encoded at the first non-speech rate, then the received frame is re-encoded at either a second or third non-speech rate to generate a frame of a second speech signal. Moreover, a system for converting a speech signal comprises a receiver for receiving a frame of a first speech signal and a processor capable of determining the encoding rate of the received frame and re-encoding the received frame at either a second or third non-speech rate if the received frame was originally encoded at a first non-speech rate.

27 Claims, 5 Drawing Sheets

CONVERSION SCHEME FOR USE BETWEEN DTX AND NON-DTX SPEECH CODING SYSTEMS

BACKGROUND OF THE INVENTION

1. Field of the Invention

The present invention relates generally to the field of speech coding and, more particularly, to conversion schemes for use between discontinuous transmission silence description systems and continuous transmission silence description systems.

2. Related Art

Speech communication systems typically include an encoder, a communication channel and a decoder. A digitized speech signal is inputted into the encoder, which converts the speech signal into a bit stream at one end of the communication link. The bit-stream is then transmitted across the communication channel to the decoder, which processes the bit-stream to reconstruct the original speech signal. As part of the encoding process, the speech signal can be compressed in order to reduce the amount of data that needs to sent through the communication channel. The goal of compression is to minimize the amount of data needed to represent the speech signal, while still maintaining a high quality reconstructed speech signal. Various speech coding techniques are known in the art including, for example, linear predictive coding based methods that can achieve compression ratios of between 12 and 16. Accordingly, the amount of data that has to be sent across the communication channel is significantly lowered, which translates to greater system efficiency. For example, more efficient use of available bandwidth is possible since less data is transmitted.

A refinement of typical speech encoding techniques involves multi-mode encoding. With multi-mode encoding, different portions of a speech signal are encoded at different rates, depending on various factors, such as system resources, quality requirements and the characteristics of the speech signal. For example, a Selectable Mode Vocoder ("SMV") can continually select optimal encoding rates, thereby providing enhanced speech quality while making it possible to increase system capacity.

Discontinuous transmission ("DTX") is another method for reducing the amount of data that has to be transmitted across a communication channel. DTX takes advantage of the fact that only about 50% of a typical two-way conversation comprises actual speech activity, while the remaining 50% is silence or non-speech. Accordingly, DTX suspends speech-data transmission when it is detected that there is a pause in the conversation. Typically, devices operating in DTX mode require a Voice Activity Detector ("VAD") configured to determine where pauses occur in the speech signal and to power-on the transmitter only when voice activity is detected. DTX can operate in conjunction with multi-mode encoding to further reduce the amount of data needed to represent a speech signal and is thereby an effective means for increasing system capacity and conserving power resources. DTX is supported by various packet-based communication systems, including certain Voice-over-IP ("VoIP") systems. For example, G.729 and G.723.1 are well-known Recommendations of the International Telecommunications Union (ITU), which support VoIP DTX-based speech coding schemes. In particular, the G.729 Recommendation provides for speech coding at a single rate of 8 Kbps, and the G723.1 Recommendation provides for a single rate of either 6.3 Kbps or 5.3 Kbps.

It is known, however, that not all current communications systems support DTX. For example, current Code Division Multiple Access ("CDMA") systems require mobile units to be in continuous contact with a base station in order to receive and transmit various control signals. As such, discontinuous transmission is not supported since transmission cannot be powered-off even when, for example, pauses occur in a conversation carried by the mobile unit.

As a result, problems can arise when a device configured to operate as part of a DTX-enabled communication system (i.e. a DTX-enabled device) communicates with a device configured to operate as part of a communication system that does not support DTX (i.e. a non-DTX device). For example, a speech signal encoded by a DTX-enabled device and transmitted to a non-DTX device may comprise empty or non-transmittal frames representing pauses in a conversation. These empty or non-transmittal frames, and thus the signal as a whole, may not be properly processed by the non-DTX device since it does not support DTX and is therefore not able to "fill up" the dropped frames it receives. When an encoded speech signal is transmitted from a non-DTX device to a DTX-enabled device, on the other hand, the advantages afforded by discontinuous transmission are diminished because the non-DTX device encodes every frame of the signal. In other words, the non-DTX device is not configured to drop any frames and consequently, every frame has to be transmitted across the communication channel, whether it contains actual speech activity or not.

Thus, there is an intense need in the art for a conversion method that can facilitate the communication between DTX-enabled devices and non-DTX devices.

SUMMARY OF THE INVENTION

In accordance with the purpose of the present invention as broadly described herein, there are provided methods and systems for converting a speech signal in a speech communication system between a device operating in DTX mode and a device not operating in DTX mode. In one aspect, a frame of a first speech signal comprising a plurality of frames encoded at a plurality of first rates, including a first non-speech rate, is received. Thereafter, the particular rate of the received frame corresponding to one of the plurality of first rates is determined. Subsequently, if it is determined that the received frame is encoded at the first non-speech rate, then the received frame is re-encoded at either a second or third non-speech rate to generate a frame of a second speech signal. In one aspect, a decision is made as to whether the received frame encoded originally at the first non-speech rate is re-encoded at the second or the third non-speech rate. For example, the decision can be based on the characteristics of the received frame. In one aspect, the first non-speech rate is 0.0 Kbps, the second non-speech rate is 0.0 Kbps, and the third non-speech rate is 0.8 Kbps. In another aspect, the first non-speech rate is 0.8 Kbps, the second non-speech rate is 0.0 Kbps, and the third non-speech rate is 0.8 Kbps.

Moreover, a system for converting a first speech signal to a second speech signal comprises a receiver for receiving a frame of the first speech signal, the first speech signal comprising a plurality of frames encoded at a plurality of first rates, including a first non-speech rate. The system further comprises a processor capable of determining the encoding rate of the received frame and capable of encoding the received frame at either a second or third non-speech rate if the processor determines that the received frame was originally encoded at the first non-speech rate.

These and other aspects of the present invention will become apparent with further reference to the drawings and specification, which follow. It is intended that all such additional systems, methods, features and advantages be included within this description, be within the scope of the present invention, and be protected by the accompanying claims.

BRIEF DESCRIPTION OF THE DRAWINGS

The features and advantages of the present invention will become more readily apparent to those ordinarily skilled in the art after reviewing the following detailed description and accompanying drawings, wherein.

DESCRIPTION OF EXEMPLARY EMBODIMENTS

The present invention may be described herein in terms of functional block components and various processing steps. It should be appreciated that such functional blocks may be realized by any number of hardware components and/or software components configured to perform the specified functions. For example, the present invention may employ various integrated circuit components, e.g., memory elements, digital signal processing elements, logic elements, and the like, which may carry out a variety of functions under the control of one or more microprocessors or other control devices. Further, it should be noted that the present invention may employ any number of conventional techniques for data transmission, signaling, signal processing and conditioning, tone generation and detection and the like. Such general techniques that may be known to those skilled in the art are not described in detail herein.

It should be appreciated that the particular implementations shown and described herein are merely exemplary and are not intended to limit the scope of the present invention in any way. Indeed, for the sake of brevity, conventional data transmission, encoding, coding, decoding, signaling and signal processing and other functional and technical aspects of the data communication system may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

Figure 1:
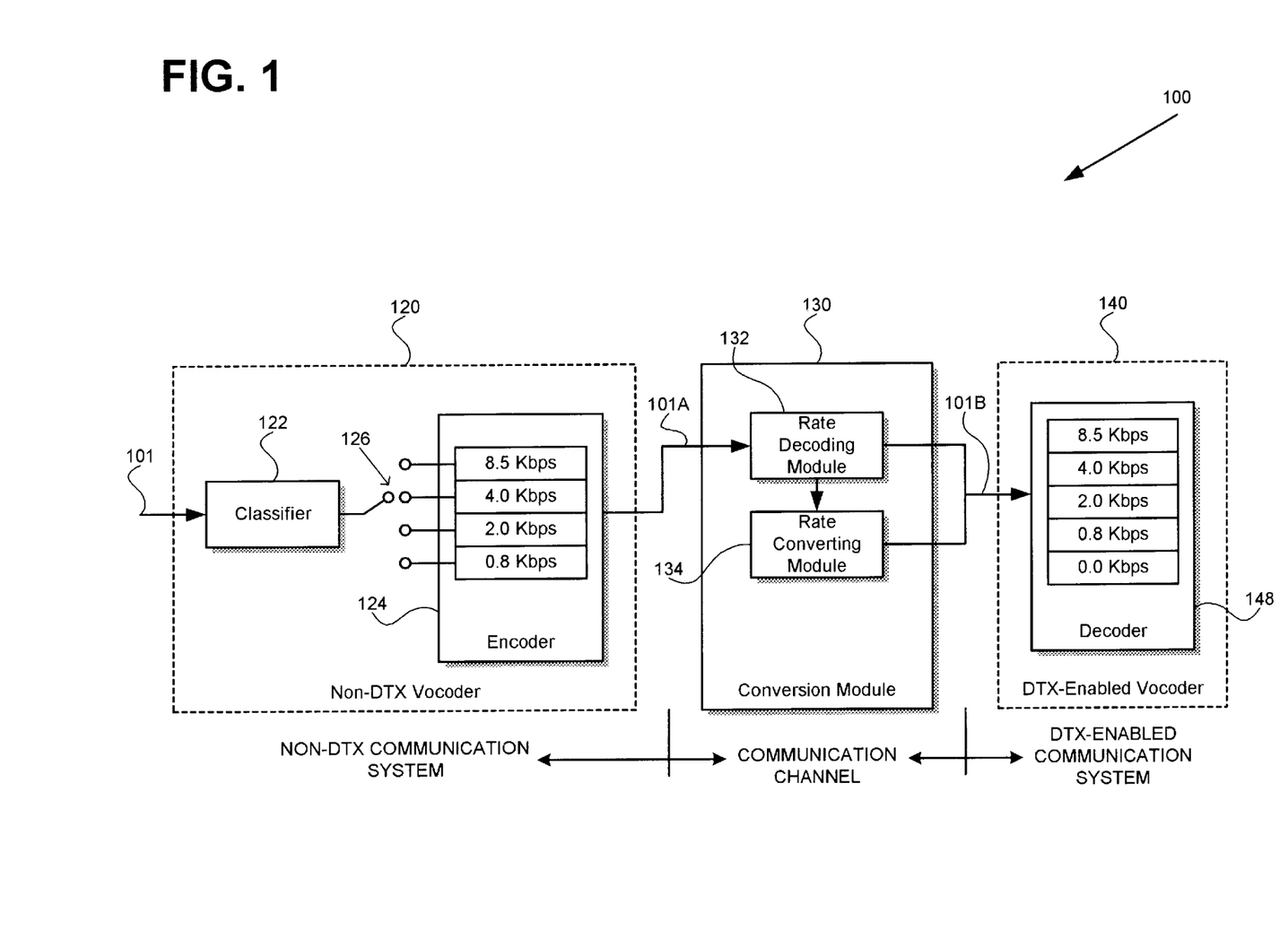
FIG. 1 illustrates a block diagram of an exemplary speech communication system according to one embodiment of the present invention, capable of converting an encoded speech signal from a device not operating in DTX mode prior to being decoded by a device operating in DTX mode.

FIG. 1 illustrates a block diagram of speech communication system 100 according to one embodiment of the present invention. In speech communication system 100, a conversion scheme is utilized to modify an encoded speech signal outputted by a device configured to communicate as part of a system that does not support discontinuous transmission ("DTX"), prior to inputting the encoded speech signal into a device configured to communicate as part of a system that does support DTX. It is noted that a device configured to communicate as part of a system not supporting DTX is also referred to as a "non-DTX" device, and a device configured to communicate as part of a system that does support DTX is also referred to as a "DTX-enabled" device, in the present application.

In speech communication system 100, non-DTX vocoder 120 can be, for example, the speech encoding component of a non-DTX device, such as a Code Division Multiple Access ("CDMA") cellular telephone, on the encoding end of speech communication system 100. Non-DTX vocoder 120 includes classifier 122, which receives input speech signal 101 and generates a voicing decision for each frame of input speech signal 101. To arrive at the voicing decision, classifier 122 can be configured to determine whether a frame contains voice activity or whether it is instead a silence or non-speech frame. Methods for detecting voice activity in speech signals are known in the art and may involve, for example, extracting various speech-related parameters, such as the energy and pitch, of the input frame. Classifier 122 can also be configured to select the desired bit rate at which each frame of input speech signal 101 is to be encoded. Typically, the decision as to what bit rate a frame is to be encoded depends on several factors, e.g., the characteristics of the input speech signal, the desired output quality and the system resources. The speech/non-speech status of the frame and the desired encoding bit rate are sent to encoder 124 in the form of a voicing decision for the frame.

In the present embodiment, non-DTX vocoder 120 is a selectable mode vocoder ("SMV"), and the coding module of non-DTX vocoder 120, i.e. encoder 124, can be configured to encode frames of an inputted speech signal at various bit rates, including at 8.5, 4.0, 2.0 and 0.8 Kbps, as shown in FIG. 1. It is appreciated, however, that the present invention may be implemented with other non-DTX devices configured to encode speech at other bit rates, and the use of a non-DTX SMV device in the present embodiment is solely for illustrative purposes. The voicing decision generated by classifier 122 acts as a switch, i.e. switch 126, between the various coding rates supported by encoder 124. Thus, depending on the voicing decision encoder 124 receives from classifier 122, encoder 124 encodes each frame of speech signal 101 at either 8.5, 4.0, 2.0 or 0.8 Kbps. More specifically, encoder 124 can be configured to encode frames of speech signal 101, which are determined by classifier 122 to contain speech activity, at a bit rate of 8.5, 4.0 or 2.0 Kbps and to encode non-speech or silence frames at 0.8 Kbps bit rate.

Since non-DTX vocoder 120 is not configured for discontinuous transmission, every frame of input speech signal 101 is encoded at some non-zero bit rate by encoder 124. In the present embodiment, all non-speech or silence frames of speech signal 101 are encoded at 0.8 Kbps. Thus, a frame encoded at 0.8 Kbps by encoder 124 would contain data characterizing background noise and might include, for example, information related to the energy and spectrum, for example, in the form of line spectral frequencies ("LSF") of the non-speech frame. It should be noted that some communication systems do not support discontinuous transmission. For example, discontinuous transmission is not available in current CDMA systems, which require mobile units to maintain continuous contact with a base station in order to receive pilot and power control information.

The result of the classifying and coding performed by classifier 122 and encoder 124, respectively, is a compressed form of input speech signal 101 comprising frames of speech encoded at any one of the encoding bit rates supported by non-DTX vocoder 120.

The compressed form of input speech signal 101 is shown in FIG. 1 as encoded speech signal 101 A.

As shown, speech communication system 100 further includes DTX-enabled vocoder 140, which is situated at the decoding end of speech communication system 100.

DTX-enabled vocoder 140 can be a device configured to communicate as part of a packet-based network that supports DTX, for example. In the present embodiment, DTX-enabled vocoder 140 is a selectable mode vocoder comprising decoder 148 configured to decode input speech signals encoded at various bit rates, e.g., at 8.5, 4.0, 2.0 or 0.8 Kbps. However, it should be appreciated that the invention can be implemented with other types of DTX-enabled devices configured to communicate in other types of communications systems and configured to utilize algorithms that provide for speech processing at other bit rates. For instance, DTX-enabled vocoder 140 can instead be configured to operate in a communication system that uses the G.729 or G.723.1 standards for speech coding.

As discussed above, discontinuous transmission refers generally to the suspension of speech data transmission when there is no voice activity in the speech signal. The advantages of discontinuous transmission include less interference, greater system capacity and reduced power consumption. When operating in DTX mode, DTX-enabled vocoder 140 is able to identify non-speech frames of an input speech signal and to process the speech signal correctly while not having to "decode" non-speech frames. However, the advantages afforded by discontinuous transmission are diminished when DTX-enabled vocoder 140 communicates with an encoder that does not support discontinuous transmission, e.g. encoder 124, since such an encoder would encode every frame of an input speech signal, including those frames of the speech signal not containing actual speech activity. In such instance, excessive data that are not necessary for effective reconstruction of the speech signal by vocoder 140 may nevertheless be transmitted across the communication channel, resulting in an inefficient use of bandwidth.

Continuing with FIG. 1, speech communication system 100 further comprises conversion module 130, which is situated in the communication channel between non-DTX vocoder 120 and DTX-enabled vocoder 140. Conversion module 130 is capable of transforming encoded speech signal 101A to converted speech signal 101B and comprises rate decoding module 132 and rate converting module 134. Encoded speech signal 101A arriving at conversion module 130 from non-DTX vocoder 120 is initially received by rate decoding module 132. The function of rate decoding module 132 in the present embodiment is to process each frame of encoded speech signal 101A and to determine the particular bit rate at which each frame was encoded. In the present embodiment, if rate decoding module 132 determines that a frame was encoded at a bit rate of 8.5, 4.0 or 2.0 Kbps, it would indicate that the frame contains data representing actual speech activity. Frames containing speech data, i.e. frames coded at 8.5, 4.0 or 2.0 Kbps, are sent to DTX-enabled vocoder 140 as part of converted speech signal 101B without further processing. Frames encoded at 0.8 Kbps, on the other hand, are identified as containing only data related to background noise, and such frames are sent to rate converting module 134 for further processing.

Rate converting module 134 is configured to decode and analyze the contents of each 0.8 Kbps frame of encoded speech signal 101A in order to determine whether the frame needs to be sent to DTX-enabled vocoder 140. It is desirable for the encoding device in a speech communication system to provide the decoding device with the characteristics of the background environment associated with the speech signal. The decoding device may use this background data as a reference to reconstruct the speech signal. Furthermore, background characteristics typically change relatively slowly, and frames of background data can contain redundant information which may not be needed by the decoding device to effectively reconstruct the speech signal. Therefore, if the characteristics of the background environment is not varying, a decoding device can still decode a speech signal effectively by reproducing the background information based on the data from a last frame of background data it received, for example. In other words, effective decoding can be still be achieved when the decoding device is updated with significant changes in the background characteristics.

Continuing with FIG. 1, the role of rate converting module 134 in the present embodiment is to decode and analyze each frame of encoded speech signal 101A encoded at 0.8 Kbps in order to determine whether the background characteristics contained in the frame need to be provided to the decoding device, i.e. to packet-based vocoder 140. Rate converting module 134 can be configured to compare various background related parameters for the present frame against the background related parameters for the last 0.8 Kbps frame or frames. Background related parameters which can be compared include, for example, the energy level and the spectrum represented, for example, in terms of LSF of the two frames. From the comparison, rate converting module 134 would be able to determine whether the background characteristics have changed significantly. A significant change can be defined, for example, as a difference between the two frames that exceeds a definable threshold level. If the background characteristics of the present 0.8 Kbps frame are not significantly different from the background characteristics of the previous 0.8 Kbps frame or frames, then the present 0.8 Kbps frame is dropped. Under this condition, i.e. when conversion module 130 drops a frame of encoded speech signal 101A, a decoding device can determine which frame has been dropped from the bit-stream based on, for example, the time stamps of received frames and the missing time stamps of dropped frames.

However, if a significant difference is detected between the background characteristics of the present 0.8 Kbps frame and the background characteristics of the last 0.8 Kbps frame of encoded speech signal 101A, then rate converting module 134 may conclude that the characteristics of the background environment have changed to an extent that warrants updating DTX-enabled vocoder 140 with new background data. The detection of a significant difference in background characteristics between the two frames triggers rate converting module 134 to re-encode the present 0.8 Kbps frame. The present 0.8 Kbps frame can be re-encoded using any suitable encoding method known in the art such as, for example, a linear predictive coding ("LPC") based method which uses a sampling system in which the characteristics of a speech signal at each sample time is predicted to be a linear function of past characteristics of the signal. Thus, in re-encoding the present 0.8 Kbps frame, rate converting module 134 has to take into account whether the previous frame of encoded speech signal 101A was dropped, since the past characteristics of encoded speech signal 101A can be altered by having dropped frames. In such case, the present 0.8 Kbps frame needs to be re-encoded to reflect the alterations to speech signal 101 resulting from having dropped frames. Once re-encoded, the present 0.8 Kbps frame is transmitted to DTX-enabled vocoder 140 as part of speech signal 101B.

In certain embodiments, rate conversion module 130 can be configured to analyze and also drop certain frames encoded at other bit rates besides the bit rate designated by the non-DTX system for encoding silence and background data, if rate conversion module 130 determines that such frames are not needed by the decoding device to reconstruct the speech signal adequately. For example, in speech communication 100, rate decoding module 132 can send frames of speech signal 101A encoded at either 0.8 Kbps or 2.0 Kbps to rate converting module 134, which can be configured to determine which frames need to be transmitted to the decoding device, i.e. to packet-based vocoder 140. Other frames, including certain frames encoded at 2.0 Kbps, may be dropped if rate converting module 134 determines that satisfactory reconstruction of the speech signal can be accomplished without such frames. Furthermore, rate decoding module 132 may, for example, send frames of speech signal 101A encoded at any given rate, such as 0.8 Kbps, 2.0 Kbps, 4.0 Kbps, 8.5 Kbps, etc. to rate converting module 134, which can be configured to determine which frames need to be transmitted to the decoding device at 0.8 Kbps. Other frames, including certain frames encoded at 0.8 Kbps, 2.0 Kbps, 4.0 Kbps, 8.5 Kbps, etc., may be dropped if rate converting module 134 determines that satisfactory reconstruction of the speech signal can be accomplished without such frames. In this manner, a more aggressive DTX system can be achieved, wherein a reduced amount of data is transmitted to the decoding device.

Thus, FIG. 1 illustrates a speech communication system wherein a conversion scheme converts a speech signal encoded by an encoding device not operating in DTX mode into a form that that can be transmitted to a decoding device operating in DTX mode. More specifically, the conversion scheme drops non-speech frames of the speech signal carrying redundant background data, resulting in a speech signal of reduced data and in more efficient use of bandwidth.

Figure 2:
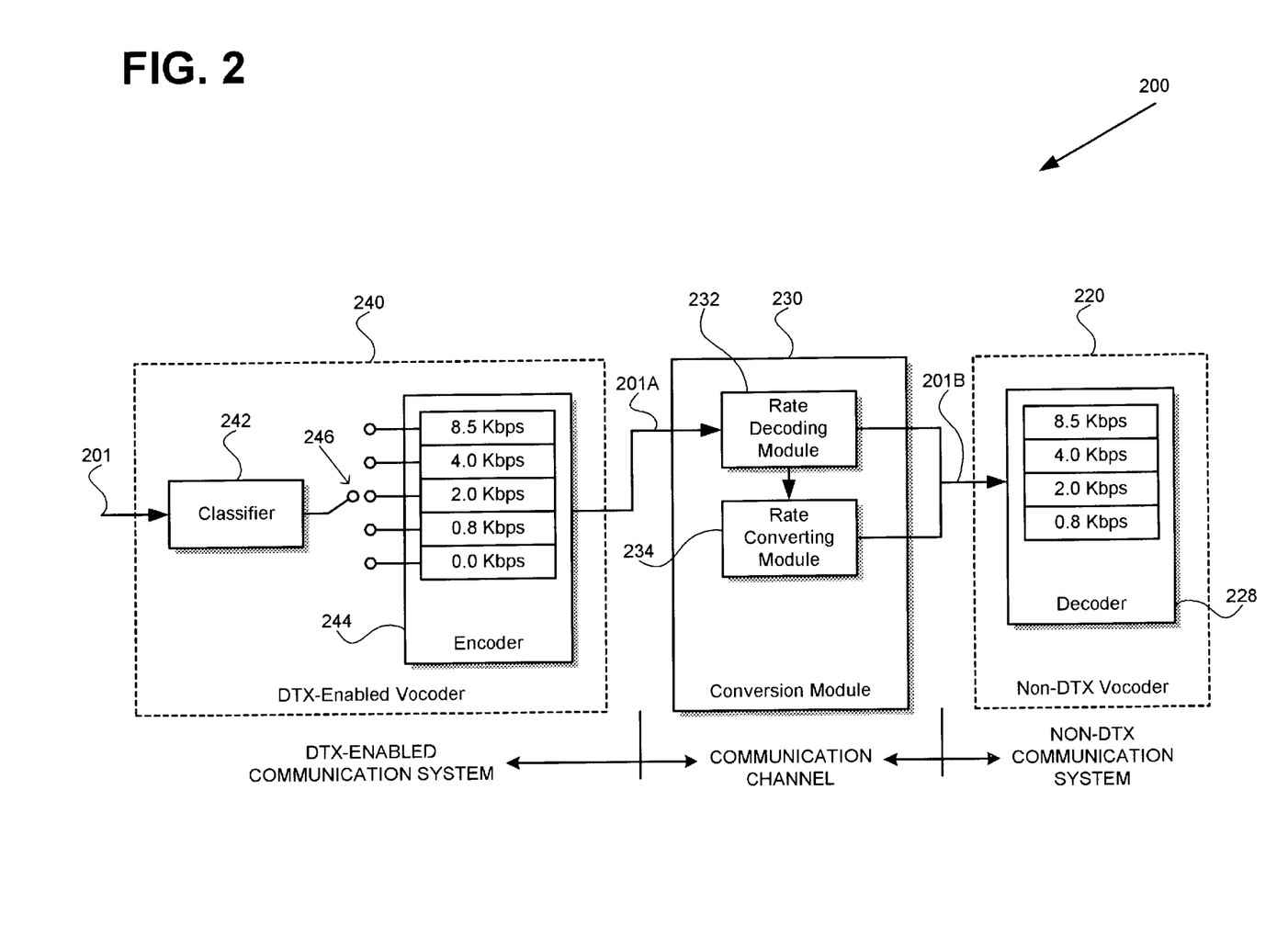
FIG. 2 illustrates a block diagram of an exemplary speech communication system according to one embodiment of the present invention, capable of converting an encoded speech signal from a device operating in DTX mode prior to being decoded by a device not operating in DTX mode.

FIG. 2 illustrates exemplary speech communication system 200 in accordance with one embodiment. Speech communication system 200 comprises packet-based vocoder 240, conversion module 230 and non-DTX vocoder 220, which correspond respectively to DTX-enabled vocoder 140, conversion module 130 and non-DTX vocoder 120 in speech communication system 100 in FIG. 1. But unlike FIG. 1, here, DTX-enabled vocoder 240 is the encoding device and non-DTX vocoder 220 is the decoding device.

Thus, in speech communication system 200, a speech signal encoded by a device configured to operate as part of a communication system that supports DTX is converted, prior to inputting the encoded speech signal into a device configured to operate as part of a communication system that does not support DTX.

As shown, DTX-enabled vocoder 240 includes classifier 242 and encoder 244. In the present embodiment, input speech signal 201 is inputted into classifier 242, which processes each frame of speech signal 201 and generates a voicing decision for each frame. The voicing decision generated by classifier 242 can include data on whether a frame contains actual speech activity and also the desired encoding bit rate for the frame. The voicing decision then acts as a switch, i.e. switch 246, between the various encoding rates supported by encoder 244. As shown, encoder 244 is configured to encode actual speech activity at various bit rates, including at 8.5, 4.0 and 2.0 Kbps, depending on the voicing decision generated by classifier 242.

However, since DTX-enabled vocoder 240 is operating in DTX mode, encoder 244 can be configured to encode certain non-speech frames of input speech signal 201 at 0.8 Kbps and to drop other non-speech frames. As discussed above, it is generally desirable for the encoding device in a speech communication system to provide the decoding device with background noise data. Thus, encoder 244 can be configured to encode at 0.8 Kbps only those non-speech frames which will provide the decoding device with data necessary for the decoding device to reconstruct the speech signal. For example, the frames encoded at 0.8 Kbps can provide the decoding device with characteristics of the background such as the energy and the spectrum of the frame. Other non-speech frames of input speech signal 201, i.e. those frames containing redundant background data, can be dropped by encoder 244. In other words, encoder 244 can drop certain non-speech frames when such frames do not indicate a significant change in the background noise and are therefore not needed by the decoding device to reconstruct the speech signal. In this manner, encoder 244 only has to expend processing power encoding the small number of non-speech frames of input speech signal 201 necessary for the effective reconstruction of the speech signal by the decoder. Also, as a result of frames containing redundant background data being dropped, less bandwidth is needed to transmit the encoded speech signal. The resulting encoded speech signal, i.e. encoded speech signal 201A, comprises frames of actual speech data encoded at either 8.5, 4.0 or 2.0 Kbps, and frames of background data encoded at 0.8 Kbps. Frames of input speech signal 201, which are dropped by encoder 244 because they contain redundant background data, are not included in encoded speech signal 201A.

Encoded speech signal 201A is sent to conversion module 230, which is placed in the communication channel between DTX-enabled vocoder 240 and non-DTX vocoder 220. Using a conversion scheme that will be described below, conversion module 230 transforms encoded speed signal 201A to converted speech signal 201B and transmits converted speech signal 201B to non-DTX vocoder 220. As shown, non-DTX vocoder 220 comprises decoder 228, which is a selectable mode vocoder configured to decode an inputted speech signal which may have been encoded at various bit rates, including at 8.5, 4.0, 2.0 and 0.8 Kbps. But because non-DTX vocoder 220 is not configured for discontinuous transmission, decoder 228 is not configured to decode, i.e. process, frames of a speech signal that may have been dropped by an encoding device, such as DTX-enabled vocoder 240, configured for communication in a system that supports DTX.

Continuing with FIG. 2, conversion module 230 comprises rate decoding module 232 and rate converting module 234. Encoded speech signal 201A, transmitted from DTX-enabled vocoder 240 to conversion module 230, is initially received by rate decoding module 232. Rate determining module 232 processes and analyzes each frame of encoded speech signal 201A to determine the bit rate at which each frame was encoded. If a frame is determined by rate decoding module 232 to have been encoded by encoder 244 at 8.5, 4.0 or 2.0 Kbps, for example, the frame is sent to non-DTX vocoder 220 as part of converted speech signal 201B without further processing by conversion module 230.

However, frames of encoded speech signal 201A encoded at 0.8 or 0.0 Kbps are sent to rate converting module 234 for further processing. Rate converting module 234 can be configured to generate a replacement frame for each empty or dropped frame of encoded speech signal 201A. For example, rate converting module 234 can construct a replacement 0.8 Kbps frame as a substitute for a dropped frame based on the background data contained in the most recent frame actually encoded by encoder 244 at 0.8 Kbps. Thus, a replacement 0.8 Kbps frame can contain, for example, frame energy and spectrum data (e.g., LSF) derived from the frame energy and the spectrum of the most recent 0.8 Kbps frame of encoded speech signal 201A. Additionally, when replacement 0.8 Kbps frames are generated for dropped frames, rate converting module 234 might also re-encode certain frames of encoded speech signal 201A that were encoded originally at 0.8 Kbps. The re-encoding of certain 0.8 Kbps frames might be needed to properly reflect changes to the speech signal's past characteristics resulting from substituting dropped frames with replacement 0.8 Kbps frames. Replacement 0.8 Kbps frames and re-encoded 0.8 Kbps frames are then transmitted to non-DTX vocoder 220 as part of converted speech signal 201B. As such, converted speech signal 201B comprises frames containing actual speech activity encoded at either 8.5, 4.0 or 2.0 Kbps, frames containing background data encoded originally at 0.8 Kbps by encoder 244, replacement 0.8 Kbps frames containing background data derived from frames originally encoded at 0.8 Kbps and re-encoded 0.8 Kbps frames re-encoded by rate converting module 234. It should be noted that rate converting module 234 may generate replacement frames for dropped frames at rates other than 0.8 Kbps. For example, rate converting module 234 may generate replacement frames for dropped frames at rates such as 2.0 Kbps, 4.0 Kbps, 8.5 Kbps, etc. Furthermore, rate converting module 234 may re-encode 0.8 Kbps frames at rates such as 2.0 Kbps, 4.0 Kbps, 8.5 Kbps, etc. As shown, after processing by conversion module 230, converted speech signal 201B is transmitted to non-DTX vocoder 220 where it can be decoded by decoder 228.

Thus, FIG. 2 illustrates an exemplary speech communication system wherein the encoding device is configured to communicate in a system that supports DTX while the decoding device is configured to communicate in a system that does not support DTX, and wherein a conversion scheme is implemented to convert an encoded speech signal coming from the encoding device into a form that can be better decoded by the decoding device. More particularly, a conversion module situated in the communication channel between the encoding and decoding devices generates replacement frames to substitute for frames dropped by the encoding device operating in DTX mode. In this manner, the encoded speech signal is converted into a speech signal that can be more effectively decoded by the decoding device.

Figure 3:
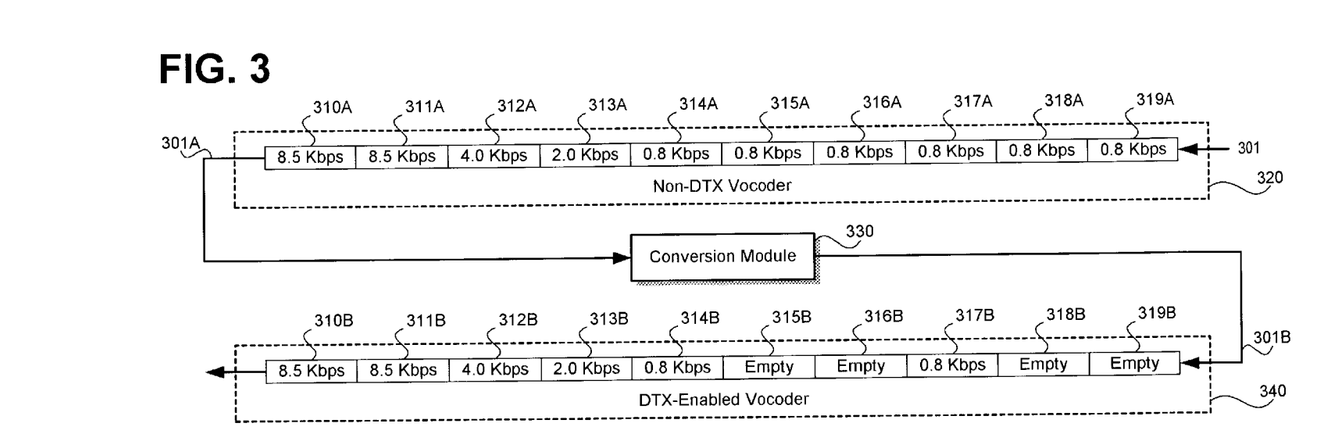
FIG. 3 illustrates a speech signal, which is modified by the speech communication system of FIG. 1.

FIG. 3 illustrates the conversion of a speech signal as it travels through speech communication system 100, in accordance with one embodiment. As such, non-DTX vocoder 320, conversion module 330 and DTX-enabled vocoder 340 in FIG. 3 correspond respectively to non-DTX vocoder 120, conversion module 130 and DTX-enabled vocoder 140 in speech communication system 100 in FIG. 1.

In FIG. 3, speech signal 301 is inputted into non-DTX vocoder 320, which encodes speech signal 301 to generate encoded speech signal 301A comprising frames 310A–319A. Since non-DTX vocoder 320 is not configured for discontinuous transmission in the present embodiment, each of frames 31A–319A is encoded at some non-zero bit rate. For example, as shown, frames 310A and 311A are encoded at 8.5 Kbps, frame 312A is encoded at 4.0 Kbps and frame 313A is encoded at 2.0 Kbps. Non-speech frames of input speech signal 301, however, are encoded by non-DTX vocoder 320 at 0.8 Kbps, resulting in frames 314A–319A.

Encoded speech signal 301A is then transmitted by non-DTX vocoder 320 to conversion module 330. Conversion module 330 processes each frame of encoded speech signal 301A to generate converted speech signal 301B, which is transmitted to DTX-enabled vocoder 340. Converted speech signal 301B comprises frames 310B–319B, and it is appreciated that frame 310B corresponds to frame 310A, frame 311B corresponds to frame 311A, frame 312B corresponds to frame 312A, and so forth.

When encoded speech signal 301A is processed by conversion module 330, frames of encoded speech signal 301A encoded at either 8.5, 4.0 or 2.0 Kbps, i.e. frames 310A–313A, are transmitted to DTX-enabled vocoder 340 without modification. Non-speech frames, i.e. those frames containing only background data and encoded at 0.8 Kbps, are subject to further processing by conversion module 330. Thus, frames 314A–319A are decoded and analyzed by conversion module 330 to determine whether any of frames 314A–319A need to be re-encoded and transmitted to DTX-enabled vocoder 340, or whether any of frames 314A–319A can be dropped because such frames contain redundant background data. As an illustration, in frames 314A–319A, frame 314A contains new background data while frames 315A and 316A contain background data that is not significantly different from frame 314. Therefore, conversion module 330 re-encodes frame 314A at 0.8 Kbps as frame 314B and transmits frame 314B as part of converted speech signal 301B; however, frames 315A and 316A are dropped, and in their place, conversion module 330 sends empty frames 315B and 316B.

Continuing with the present illustration, in frames 314A–319A, frame 317A contains background data that is significantly different from frames 314A, 315A and 316A. Accordingly, conversion module 330 re-encodes frame 317A at 0.8 Kbps using a suitable encoding method, such as an LPC-based method, which results in frame 317B. When using an LPC-based method, for example, conversion module 330 has to take into account the fact that frames 315A and 316A were dropped when re-encoding frame 317A, since dropping frames 315A and 316A changed the past characteristics of speech signal 301. Re-encoded frame 317A is then transmitted as frame 317B to DTX-enabled vocoder 340 as part of converted speech signal 301B. Frames 318A and 319A, meantime, contain background data that is not significantly different from frame 317B. Consequently, frames 318A and 319A are dropped, and in their place, conversion module 330 sends empty frames 318B and 319B. Thus, FIG. 3 illustrates the modifications made to a speech signal as it travels through an exemplary speech communication system, such as speech communication system 100, in accordance with one embodiment.

Figure 4:
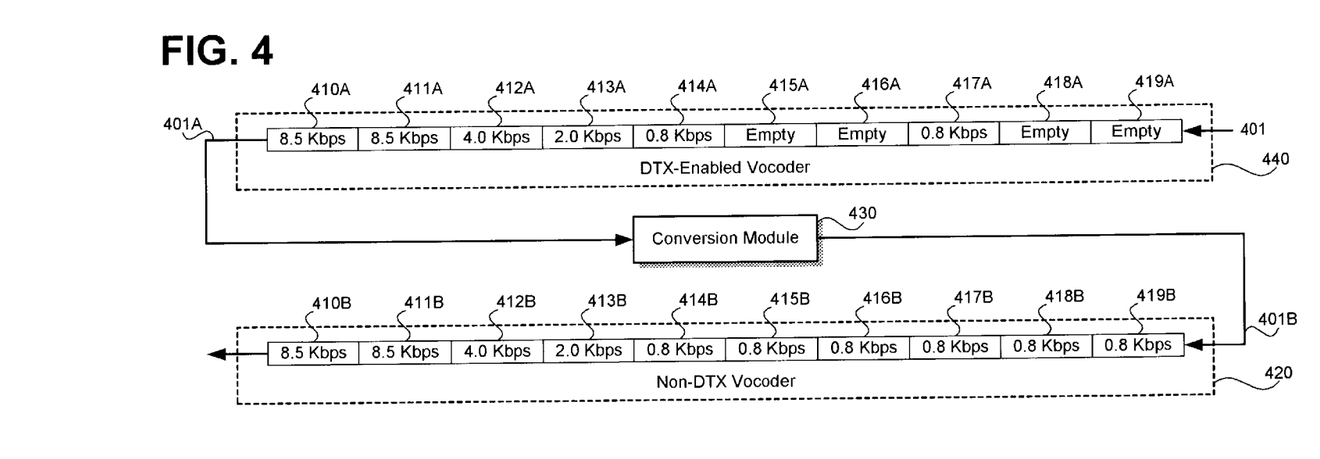
FIG. 4 illustrates a speech signal, which is modified by the speech communication system of FIG. 2.

FIG. 4 illustrates the conversion of a speech signal as it travels through speech communication system 200 in FIG. 2, in accordance with one embodiment. As such, DTX-enabled vocoder 440, conversion module 430 and non-DTX vocoder 420 in FIG. 4 correspond respectively to DTX-enabled vocoder 240, conversion module 230 and non-DTX vocoder 220 in speech communication system 200.

In FIG. 4, speech signal 401 is inputted into DTX-enabled vocoder 440, which encodes speech signal 401 to generate encoded speech signal 401A comprising frames 410A–419A. DTX-enabled vocoder 440 can be configured to encode frames of input speech signal containing actual speech activity at either 8.5, 4.0 or 2.0 Kbps. Furthermore, because it supports discontinuous transmission, DTX-enabled vocoder 440 can be configured to encode non-speech frames at 0.8 Kbps if DTX-enabled vocoder 440 determines that such non-speech frames contain background data needed by the decoding device to reconstruct the speech signal accurately. Otherwise, non-speech frames of input speech signal 401 containing redundant background data are dropped and substituted by empty frames.

Thus, in FIG. 4, frames 410A–413A are encoded respectively at 8.5, 8.5, 4.0 and 2.0 Kbps, indicating that these frames contain voice activity. Frame 414A is encoded at 0.8 Kbps and therefore contains background data needed by the decoding device to reconstruct the speech signal, while frames 415A and 416A are dropped or empty frames, which means that frames 415A and 416A are non-speech frames containing background data that is not significantly different from the background data contained in frame 414A. Continuing, frame 417A is encoded at 0.8 Kbps, indicating that DTX-enabled vocoder 440 determined that there is a significant difference in the background data contained in frame 417A and the background data contained in frames 414A, 415A and 416A. Such a determination triggers DTX-enabled vocoder 440 to encode frame 417A at 0.8 Kbps rather than dropping the frame in order to provide the decoding device with updated background data. Frames 418A and 419A are empty frames, which indicates that they have been determined to contain redundant background data previously represented by frame 417A.

Encoded speech signal 401A is inputted into conversion module 430, where it is processed to generate converted speech signal 401B. Conversion module 430 initially determines the encoding rate of each of frames 410A–419A, and those frames of encoded speech signal 401A encoded at 8.5, 4.0 or 2.0 Kbps are transmitted to non-DTX vocoder 420 as part of converted speech signal 401B without further processing by conversion module 430. Therefore, as shown, frames 410A–413A are transmitted unmodified to non-DTX vocoder 420 as frames 410B–413B.

Frames 414A–419A are processed further by conversion module 430. Since the frames preceding frame 414A have not been modified, conversion module 430 can transmit frame 414A to non-DTX vocoder 420 as frame 414B without having to re-encode frame 414A. For frames 415A and 416A, which are both empty frames, conversion module 430 can be configured to generate replacement 0.8 Kbps frames based on the background information contained in frame 414A. For example, conversion module 430 can generate replacement frames 415B and 416B for frames 415A and 416A, respectively, by deriving background data from frame 414A, and re-encoding the derived information using an LPC-based method.

The next frame of encoded speech signal 401A is frame 417A, which is encoded at 0.8 Kbps. Since the past characteristics of the speech signal have been changed due to the replacement of frames 415A and 416A, conversion module 430 might re-encode frame 417A to reflect the changes. Conversion module 430 might re-encode frame 417 to produce frame 417B of converted speech signal 401B. Following are frames 418A and 419A, each of which is an empty frame. Conversion module 430 can construct replacement frames for frames 418A and 419A by deriving background data from frame 417A and re-encoding the derived information to generate frames 418B and 419B.

The product of conversion module 430, i.e. converted speech signal 401B, therefore comprises frames 410B–413B containing actual speech activity encoded at either 8.5, 4.0 or 2.0 Kbps. Converted speech signal 401B further comprises frames 414B–419B containing background data and encoded at 0.8 Kbps, wherein frame 414B is a non-modified frame, frame 417B might be a re-encoded frame and frames 415B–416B and 418B–419B are replacement frames generated by conversion module 430 using background data derived from preceding frames. Thus, FIG. 4 illustrates the modifications made to a speech signal as it travels through an exemplary speech communication system, such as speech communication system 200, in accordance with one embodiment.

Figure 5:
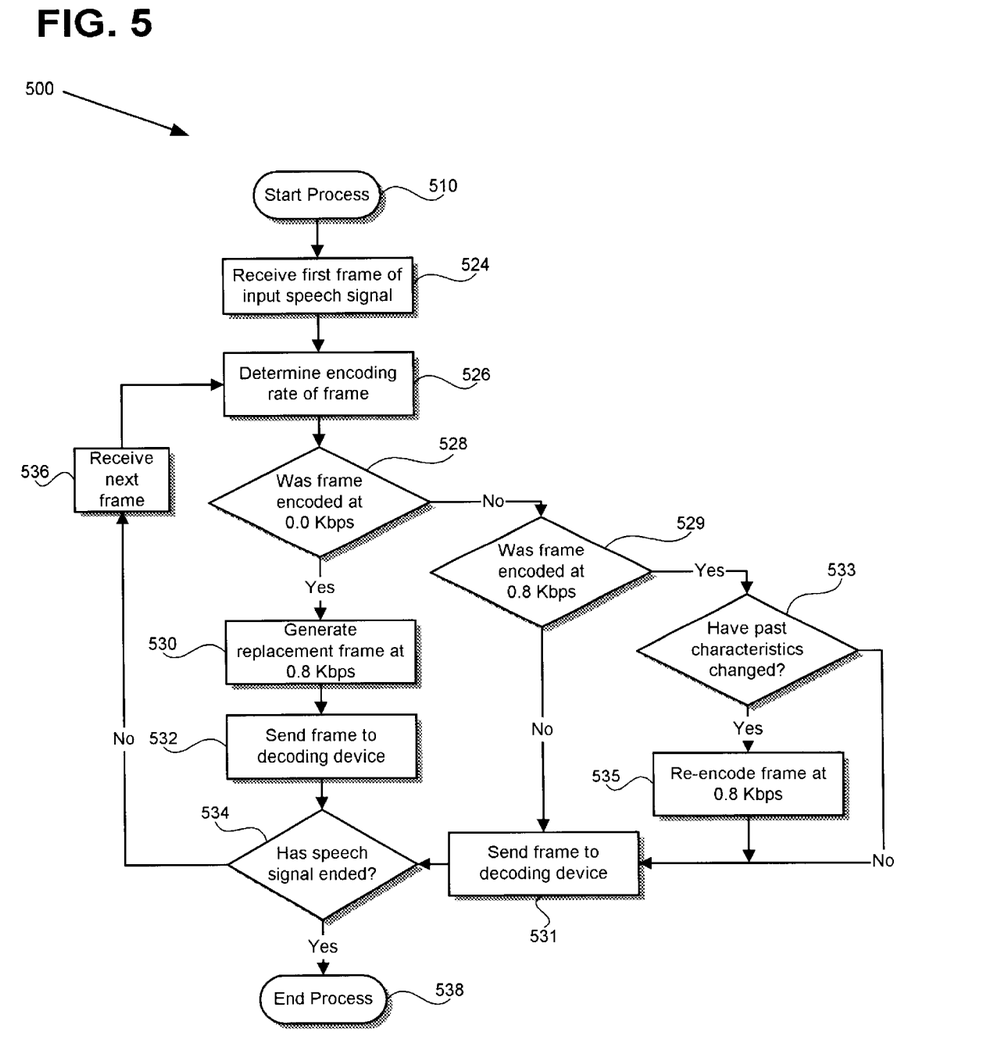
FIG. 5 illustrates a flow diagram of a DTX to non-DTX conversion method according to one embodiment of the present invention.

FIG. 5 illustrates a flow diagram of conversion method 500 according to one embodiment of the present invention, in which embodiment a speech signal encoded by a DTX-enabled device is received and converted prior to being transmitted to a non-DTX device. Conversion method 500 begins at step 510 when an encoded speech signal is received from an encoding device, and continues to step 524. At step 524, the first frame of the encoded speech signal is received. Conversion method 500 then continues to step 526 where the frame's encoding rate is determined.

Following, conversion method 500 proceeds to step 528 where it is determined whether the frame is "encoded" at 0.0 Kbps, i.e. that the frame is an empty or dropped frame, which would indicate that the DTX mechanism in the encoding device determined that the frame contains redundant background data. If it is determined at step 528 that the frame is not an empty frame, i.e. that the frame either contains voice data or else non-redundant background data, then conversion method 500 proceeds to step 529 where it is determined whether the frame is encoded at 0.8 Kbps, i.e. that the frame contains background data. If it is determined at step 529 that the frame is not encoded at 0.8 Kbps, then conversion method 500 proceeds to step 531 where the frame is sent to the decoding device. If it is instead determined at step 529 that the frame is encoded at 0.8 Kbps, then conversion method 500 proceeds to step 533 where it is determined whether the past characteristics of the speech signal have been changed, for example due to preceding frames being dropped or replaced. If the past characteristics of the speech signal have not changed, then conversion method 500 continues to step 531 where the frame is sent to the decoding device. Following, conversion method 500 proceeds to step 534.

However, if it is determined at step 533 that the past characteristics of the speech signal have changed, then the frame is re-encoded at step 535 using, for example, an LPC-based method, to reflect the changes to the speech signal. Conversion method 500 then continues to step 531 where the frame, i.e. the re-encoded frame, is sent to the decoding device. Following, conversion method 500 proceeds to step 534.

Returning again to step 528, if it is determined at step 528 that the frame is an empty frame, then conversion method 500 proceeds to step 530 where a replacement frame is generated for the empty frame. The replacement frame can be generated, for example, by deriving the background data contained in the previous background data-carrying frame and re-encoding the derived data at 0.8 Kbps, using a suitable encoding method, such as a LPC-based method. Conversion method 500 then proceeds to step 532 where the replacement frame is sent to the decoding device, following which conversion method 500 continues to step 534.

At step 534 of conversion method 500, it is determined whether the input speech signal has ended. If it is determined at step 534 that the speech signal has not ended, then conversion method 500 continues to step 536 where the next frame of the speech signal is received, following which conversion method 500 returns to step 526. If it is determined at step 534 that the speech signal has ended, then conversion method 500 proceeds to, and ends at, step 538. Thus, FIG. 5 illustrates an exemplary conversion method for converting encoded speech signals between a device operating in DTX mode and a device not operating in DTX mode.

Figure 6:
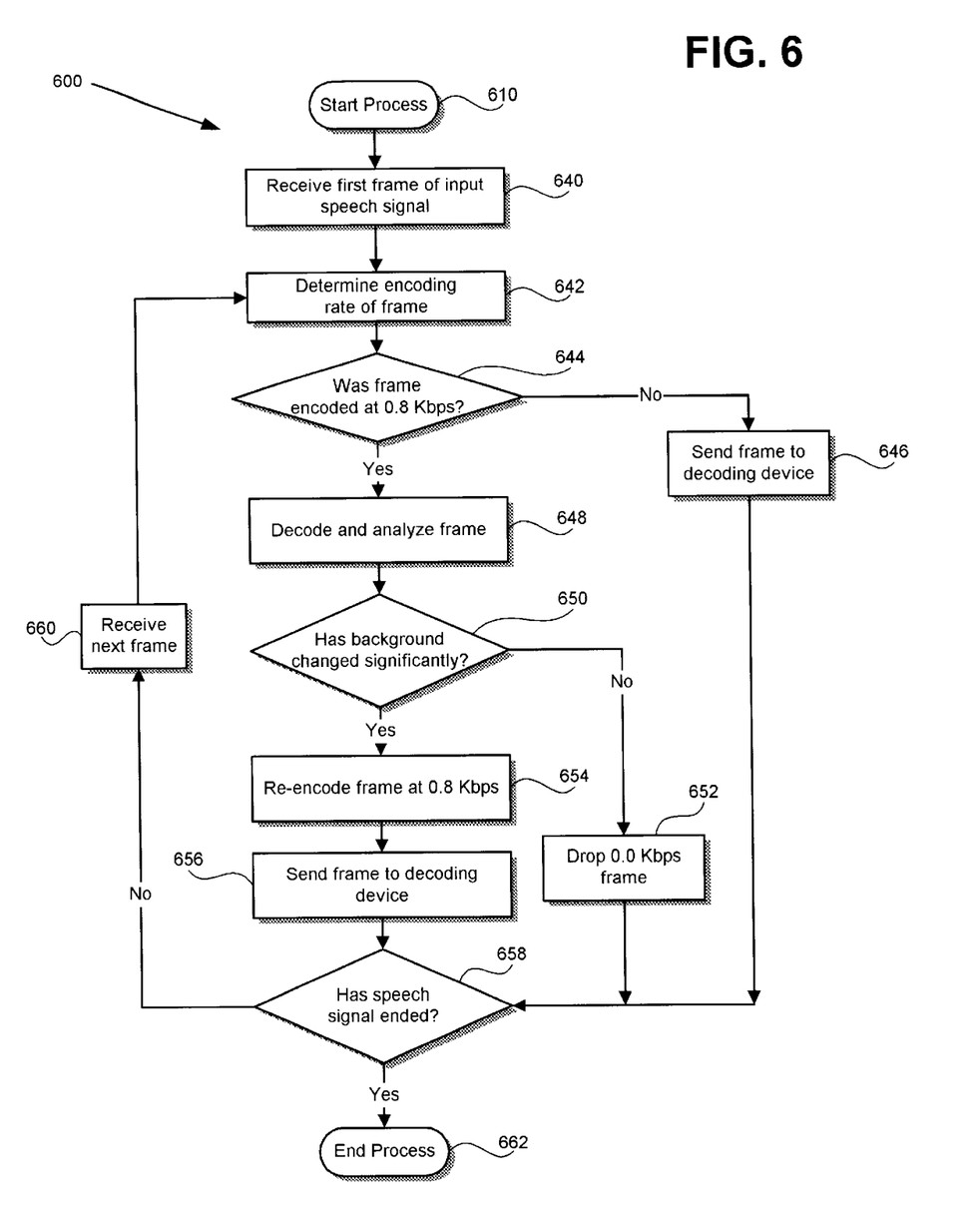
FIG. 6 illustrates a flow diagram of a non-DTX to DTX conversion method according to one embodiment of the present invention.

FIG. 6 illustrates a flow diagram of conversion method 600 according to one embodiment of the present invention, in which embodiment a speech signal encoded by a non-DTX device is received and converted prior to being transmitted to a DTX-enabled device. Conversion method 600 starts at step 610 and continues at step 640 where the first frame of the input speech signal is received. Conversion method 600 then continues to step 642 where the encoding rate of the frame is determined. Next, conversion method 600 proceeds to step 644 where it is determined whether the frame is encoded at the bit rate used by the non-DTX encoding device to encode all non-speech frames, i.e. the bit rate used to encode both new and redundant background data. Using the current CDMA systems as an example, the bit rate used for encoding all non-speech background data is 0.8 Kbps. If it is determined at step 644 that the frame is not encoded at 0.8 Kbps, then conversion method 600 proceeds to step 646 where the frame is transmitted to the DTX-enabled decoding device, after which conversion method 600 continues to step 658. If it is instead determined at step 644 that the frame is encoded at 0.8 Kbps, then conversion method 600 continues to step 648.

At step 648 of conversion method 600, the frame is decoded and analyzed to determine whether the frame's background data is new or redundant, i.e. not significantly different from the background data contained in the most recent background data frame. If at step 648 it is determined that the background data contained in the present 0.8 Kbps frame is not significantly different from the most recent background data frame, then conversion method 600 continues to step 652 where the frame is dropped. Conversion method 600 then continues to step 658.

If it is determined at step 650 that the background data contained in the present 0.8 Kbps frame is significantly different from the background data in the most recent frame carrying background data, then conversion method 600 proceeds to step 654 where the frame is re-encoded at 0.8 Kbps, using a suitable encoding method known in the art. For example, an LPC-based method can be used to re-encode the frame. In re-encoding the present frame, an LPC-based method may take in account whether or not frames preceding the present frame were dropped. Dropped frames typically result in changes to the past characteristics of the speech signal requiring the present frame to be re-encoded to reflect such changes. Following, conversion method 600 continues to step 656 where the re-encoded frame is transmitted to the decoding device.

Following, at step 658, it is determined whether the input speech signal has ended. If the speech signal has not ended, conversion method 600 then continues to step 660 where the next frame of the speech signal is received, after which conversion method 600 returns to step 642. If it is instead determined at step 658 that the input speech signal has ended, then conversion method 600 ends at step 662. Thus, FIG. 6 illustrates an exemplary conversion method for converting encoded speech signals between a device not operating in DTX mode and a device operating in DTX mode.

The present invention may be embodied in other specific forms without departing from its spirit or essential characteristics. For example, although the invention has been described in terms of specific selectable mode vocoder configurations, it is appreciated by those skilled in the art that the invention can be implemented with other communication systems comprising other types of codecs. Thus, the described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A method of transforming a first speech signal to a second speech signal, said first speech signal having a plurality of first frames encoded at one of a plurality of first rates including a first non-speech rate, said second speech signal having a plurality of second frames encoded at one of a plurality of second rates including a second non-speech rate and a third non-speech rate, said method comprising the steps of:

receiving one of said plurality of first frames, determining said one of said plurality of first frames is at said first non-speech rate; and converting said one of said plurality of first frames to generate one of said plurality of second frames encoded at said second non-speech rate or said third non-speech rate.

2. The method of claim 1, wherein said plurality of first frames are encoded by a non-DTX encoder and said plurality of second frames are encoded by a DTX encoder.

3. The method of claim 2, wherein said first non-speech rate is at 0.8 Kbps, said second non-speech rate is at 0.8 Kbps and said third non-speech rate is at 0.0 Kbps.

4. The method of claim 2, wherein said first non-speech rate is at 2.0 Kbps, said second non-speech rate is at 0.8 Kbps and said third non-speech rate is at 0.0 Kbps.

5. The method of claim 2, wherein said first non-speech rate is at 4.0 Kbps, said second non-speech rate is at 0.8 Kbps and said third non-speech rate is at 0.0 Kbps.

6. The method of claim 1, wherein said step of converting includes the step of deciding whether to encode said one of said plurality of first frames at said second non-speech rate or said third non-speech rate based on a characteristic of said one of said plurality of first frames.

7. The method of claim 1, wherein in said step of converting, said one of said plurality of first frames is encoded at said second non-speech rate if one or more of said plurality of said first frames, immediately prior to said one of said plurality of first frames, were encoded at said third non-speech rate.

8. The method of claim 7, wherein said first non-speech rate is at 0.8 Kbps, said second non-speech rate is at 0.8 Kbps and said third non-speech rate is at 0.0 Kbps.

9. A method of transforming a first speech signal to a second speech signal, said first speech signal having a plurality of first frames encoded at one of a plurality of first rates including a first non-speech rate and a second non-speech rate, said second speech signal having a plurality of second frames encoded at one of a plurality of second rates including a third non-speech rate, said method comprising the steps of:

receiving one of said plurality of first frames;

determining said one of said plurality of first frames is at said first non-speech rate or said second non-speech rate; and converting said one of said plurality of first frames to generate one of said plurality of second frames encoded at said third non-speech rate.

10. The method of claim 9, wherein said plurality of first frames are encoded by a DTX encoder and said plurality of second frames are encoded by a non-DTX encoder.

11. The method of claim 10, wherein said first non-speech rate is at 0.8 Kbps, said second non-speech rate is at 0.0 Kbps and said third non-speech rate is at 0.8 Kbps.

12. The method of claim 10, wherein said first non-speech rate is at 0.8 Kbps, said second non-speech rate is at 0.0 Kbps and said third non-speech rate is at 2.0 Kbps.

13. The method of claim 10, wherein said first non-speech rate is at 0.8 Kbps, said second non-speech rate is at 0.0 Kbps and said third non-speech rate is at 4.0 Kbps.

14. A conversion system capable of converting a first speech signal to a second speech signal, said first speech signal having a plurality of first frames encoded at one of a plurality of first rates including a first non-speech rate, said second speech signal having a plurality of second frames encoded at one of a plurality of second rates including a second non-speech rate and a third non-speech rate, said conversion system comprising:

receiver capable of receiving one of said plurality of first frames; and a processor capable of determining said one of said plurality of first frames is at said first non-speech rate and capable of converting said one of said plurality of first frames to generate one of said plurality of second frames encoded at said second non-speech rate or said third non-speech rate.

15. The system of claim 14, wherein said plurality of first frames are encoded by a non-DTX encoder and said plurality of second frames are encoded by a DTX encoder.

16. The system of claim 15, wherein said first non-speech rate is at 2.0 Kbps, said second non-speech rate is at 0.8 Kbps and said third non-speech rate is at 0.0 Kbps.

17. The system of claim 15, wherein said first non-speech rate is at 4.0 Kbps, said second non-speech rate is at 0.8 Kbps and said third non-speech rate is at 0.0 Kbps.

18. The system of claim 14, wherein said processor decides whether to encode said one of said plurality of first frames at said second non-speech rate or said third non-speech rate based on a characteristic of said one of said plurality of first frames.

19. The system of claim 14, said processor encodes said one of said plurality of first frames at said second non-speech rate if one or more of said plurality of said first frames, immediately prior to said one of said plurality of first frames, were encoded at said third non-speech rate.

20. The system of claim 19, wherein said first non-speech rate is at 0.8 Kbps, said second non-speech rate is at 0.8 Kbps and said third non-speech rate is at 0.0 Kbps.

21. The system of claim 19, wherein said first non-speech rate is at 2.0 Kbps, said second non-speech rate is at 0.8 Kbps and said third non-speech rate is at 0.0 Kbps.

22. The system of claim 19, wherein said first non-speech rate is at 8.0 Kbps, said second non-speech rate is at 0.8 Kbps and said third non-speech rate is at 0.0 Kbps.

23. A conversion system capable of converting a first speech signal to a second speech signal, said first speech signal having a plurality of first frames encoded at one of a plurality of first rates including a first non-speech rate and a second non-speech rate, said second speech signal having a plurality of second frames encoded at one of a plurality of second rates including a third non-speech rate, said conversion system comprising:

a receiver capable of receiving one of said plurality of first frames; and a processor capable of determining said one of said plurality of first frames is at said first non-speech rate or said second non-speech rate and capable of converting said one of said plurality of first frames to generate one of said plurality of second frames encoded at said third non-speech rate.

24. The system of claim 23, wherein said plurality of first frames are encoded by a DTX encoder and said plurality of second frames are encoded by a non-DTX encoder.

25. The system of claim 24, wherein said first non-speech rate is at 0.8 Kbps, said second non-speech rate is at 0.0 Kbps and said third non-speech rate is at 0.8 Kbps.

26. The system of claim 24, wherein said first non-speech rate is at 0.8 Kbps, said second non-speech rate is at 0.0 Kbps and said third non-speech rate is at 2.0 Kbps.

27. The system of claim 24, wherein said first non-speech rate is at 0.8 Kbps, said second non-speech rate is at 0.0 Kbps and said third non-speech rate is at 8.0 Kbps.

* * * * *

UNITED STATES PATENT AND TRADEMARK OFFICE
CERTIFICATE OF CORRECTION

PATENT NO. : 6,721,712 B1
DATED : April 13, 2004
INVENTOR(S) : Benyassine et al.

It is certified that error appears in the above-identified patent and that said Letters Patent is hereby corrected as shown below:

Column 15,
Line 28, reading "receiver capable of receiving one of said plurality of first" should read -- a receiver capable of receiving one of said plurality of first --.

Signed and Sealed this

Twenty-fifth Day of May, 2004

JON W. DUDAS
*Acting Director of the United States Patent and Trademark Office*